UNITED STATES PATENT OFFICE.

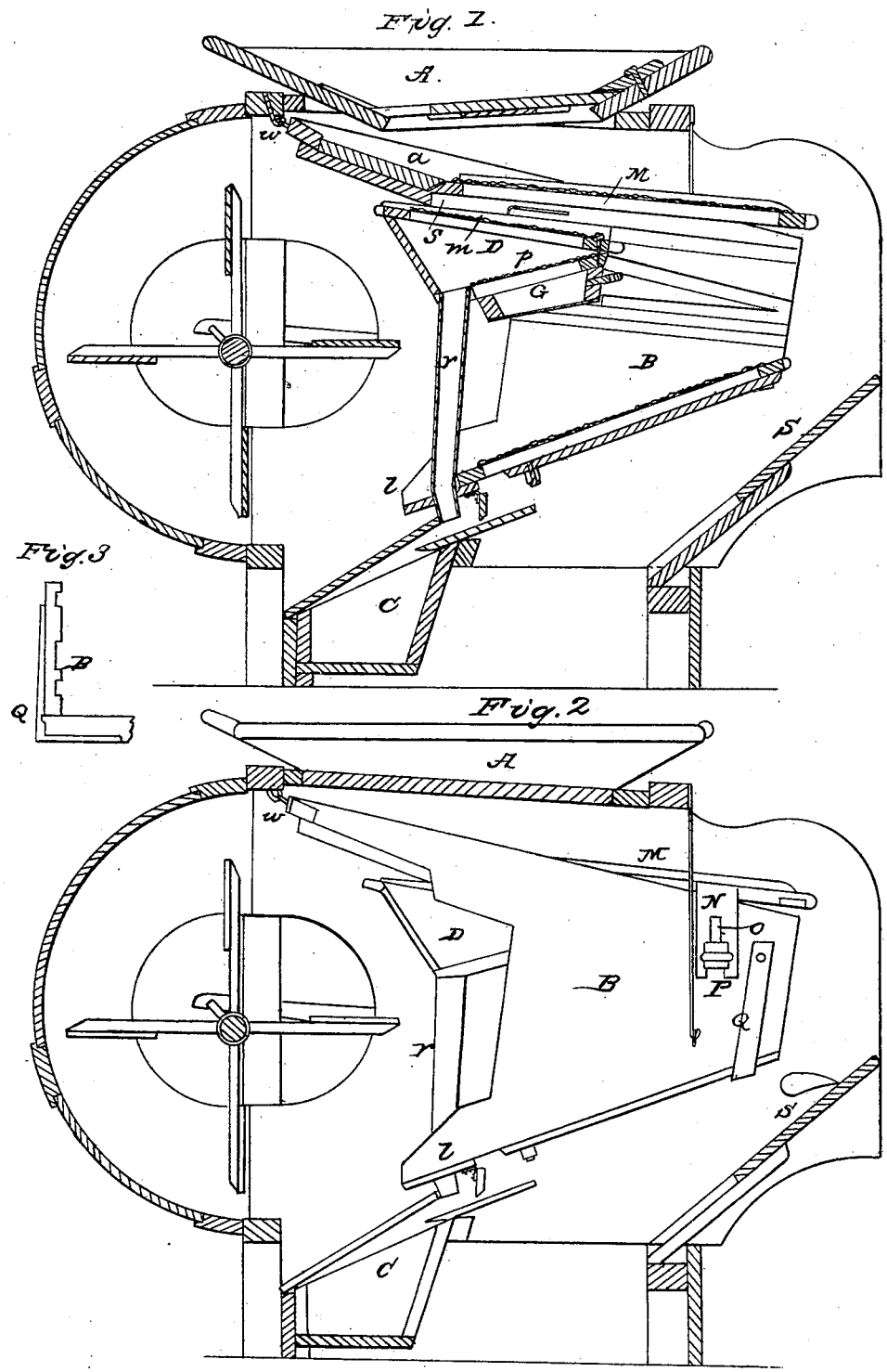

JOSEPH MONTGOMERY AND JAMES MONTGOMERY, OF BALTIMORE, MARYLAND.

WINNOWING-MACHINE.

Specification of Letters Patent No. 16,447, dated January 20, 1857.

*To all whom it may concern:*

Be it known that we, JOSEPH MONTGOMERY and JAMES MONTGOMERY, of Baltimore, in the State of Maryland, have invented a new and useful Improvement in Wheat-Fans; and we do hereby declare that the following is a full and exact description thereof, reference being had to the accompanying drawings, making part of this specification, Figure 1 being a longitudinal vertical section in the central plane of a fan constructed with our improvement; Fig. 2, a longitudinal vertical section of the same in a plane outside of the shoe, and thus showing a side elevation of said shoe; Fig. 3, view of a part detached.

Like letters designate corresponding parts in all the figures.

The general construction of the fan is the same as described in the specification of our former Letters Patent, bearing date respectively on the 20th day of December, 1853, and the 12th day of June 1855; and includes the main improvements set forth and claimed in those patents, viz., the additional, or auxiliary, screen-box D, with its screens *m* and *p*, grit-box G, and pipe *r*, for conveying the wild seeds and blighted grain down through the bottom *l*, of the shoe B, into the box C, all as therein specified. But instead of the extensible and contractible apron, as described in the specification of the Letters Patent granted to us on the 12th day of June, 1855, we use the stationary portion *a*, as there described; and, in place of the movable part of the apron, as therein specified, we employ a sieve M, extending from said stationary portion *a*, (which in the present case, is the entire apron,) to the front of the shoe. The use of this sieve is to carry off the heads of grain, together with all large impurities, and garlic seeds, while the grain, with the smaller and heavier impurities, pass through to be screened below. We term this a "sieve", meaning thereby that it conveys away the large impurities, and allows the grain to pass through; in contradistinction to the "screens" below, by which we mean devices which carry off the grain, and allow the impurities, (smaller than the grain,) to pass through.

By reference to our former improvement, the auxiliary screen-box, it will be seen that its object is to separate blighted grain and small, light seeds, (which are of value, for feeding to animals,) before subjecting the grain to the action of the blast. And since the amount of surface allowable to said auxiliary screen-box is limited, it is desirable to have it as little encumbered or clogged with grain heads &c., as possible, in order to render its action rapid and complete. With ordinary fans, such a separation of light and bulky impurities, before coming to the screens, is not required, since the blast removes most of them, before they can strike the screens. It is therefore only in double, or auxiliary screen fans, substantially such as we construct, that the apron sieve is useful, and is subject of the present improvement.

The apron *a*, extends forward as far as room will allow, and leave space for the auxiliary screen-box D, in order that the shaking motion of the shoe may be sufficient to prevent the lodging of the grain heads, straw, and other impurities, where they first strike the sieve; and at the same time, to prevent a too violent shaking of the front end of said sieve. If the sieve should first receive the contents of the hopper A, nearly back to the pivot *w*, of the shoe B, the vibratory motion would be so slight that the impurities would not be shaken forward; or if sufficient motion should be given to the shoe to effect that, the front end thereof would be shaken altogether too violently.

The upper edge of the sieve M, is inserted under a lip projecting from the lower edge of the apron *a*, as seen at *s*, in Fig. 1. Near the front end of the sieve, an arm, or strap, N, is secured to each side, as seen in Fig. 2. A vertical slot *o*, is formed in each arm, through which a tightening screw P, passes into the side of the shoe. The object of this arrangement is to enable the front end of the sieve to be moved up or down, so as to vary the inclination of its surface, according to the kind or condition of the grain.

We use corner braces Q, as represented in Figs. 2, and 3, to strengthen the corners of the shoe. These are right-angled pieces cast, and secured to the shoe by screens.

We do not claim a sieve at the top of the shoe, when unconnected with an auxiliary, or double, screen; nor do we lay claim simply to a feature of adjustment, applied to sieves; but

What we claim as our invention and desire to secure by Letters Patent, is

The application of an adjustable sieve M, above the auxiliary screen-box D, when arranged in combination therewith in such a manner as to separate the large impurities before the grain is subjected to the action of the blast, in order to render said auxiliary screen-box more efficient in its action, and thereby allow it to be made as limited in extent as desirable, substantially as herein set forth.

JOSEPH MONTGOMERY.
JAMES MONTGOMERY.

Witnesses:
   DANL. E. MYERS,
   JAMES R. FLEMMING.